(12) United States Patent
Kuroiwa

(10) Patent No.: US 6,704,561 B2
(45) Date of Patent: Mar. 9, 2004

(54) POWER MANAGEMENT SYSTEM FOR USE WITH WIRELESS LAN TERMINAL UNIT

(75) Inventor: Ken-ichi Kuroiwa, Tokyo (JP)

(73) Assignee: NEC Infrontia Corporation, Kawasaki (JP)

(*) Notice: Subject to any disclaimer, the term of this patent is extended or adjusted under 35 U.S.C. 154(b) by 630 days.

(21) Appl. No.: 09/734,194

(22) Filed: Dec. 12, 2000

(65) Prior Publication Data

US 2001/0004594 A1 Jun. 21, 2001

(30) Foreign Application Priority Data

Dec. 14, 1999 (JP) .......................................... 11-354792

(51) Int. Cl.$^7$ ................................................ H04B 1/16
(52) U.S. Cl. ................................ 455/343.1; 455/432.1; 455/574; 370/311; 713/320
(58) Field of Search .......................... 455/343.1–343.6, 455/574, 432.1; 370/311, 338; 713/320–323

(56) References Cited

U.S. PATENT DOCUMENTS 5,504,454 A * 4/1996 Daggett et al. ............. 329/304
5,790,946 A * 8/1998 Rotzoll ..................... 455/343.1
5,991,287 A * 11/1999 Diepstraten et al. ........ 370/338
6,105,086 A * 8/2000 Doolittle et al. ............... 710/52
6,539,230 B2 * 3/2003 Yen .......................... 455/456.1

FOREIGN PATENT DOCUMENTS

| JP | 8-195754 | 7/1996 |
| JP | 10-164077 | 6/1998 |
| JP | 10-187290 | 7/1998 |

* cited by examiner

Primary Examiner—Marsha D. Banks-Harold
Assistant Examiner—Nghi H. Ly
(74) Attorney, Agent, or Firm—Foley & Lardner

(57) ABSTRACT

Provided is a power management system for use with a wireless LAN terminal unit, the system having: a CPU having a suspend/resume function, a RAM; a power supply; a switch for causing the CPU to be placed in the suspend state or a resume state; and a wireless LAN communication LSI; and roaming processor for, when the wireless LAN terminal unit travels, performing a roaming process in which a wireless LAN bridge communication with the wireless LAN terminal unit is switched to another wireless LAN bridge, wherein when the CPU is placed in the suspend state, the wireless LAN communication LSI and the roaming processor are operated by the power supplied by the power supply, and wherein when the CPU is placed is the suspend state, the roaming processor performs the roaming process.

6 Claims, 9 Drawing Sheets

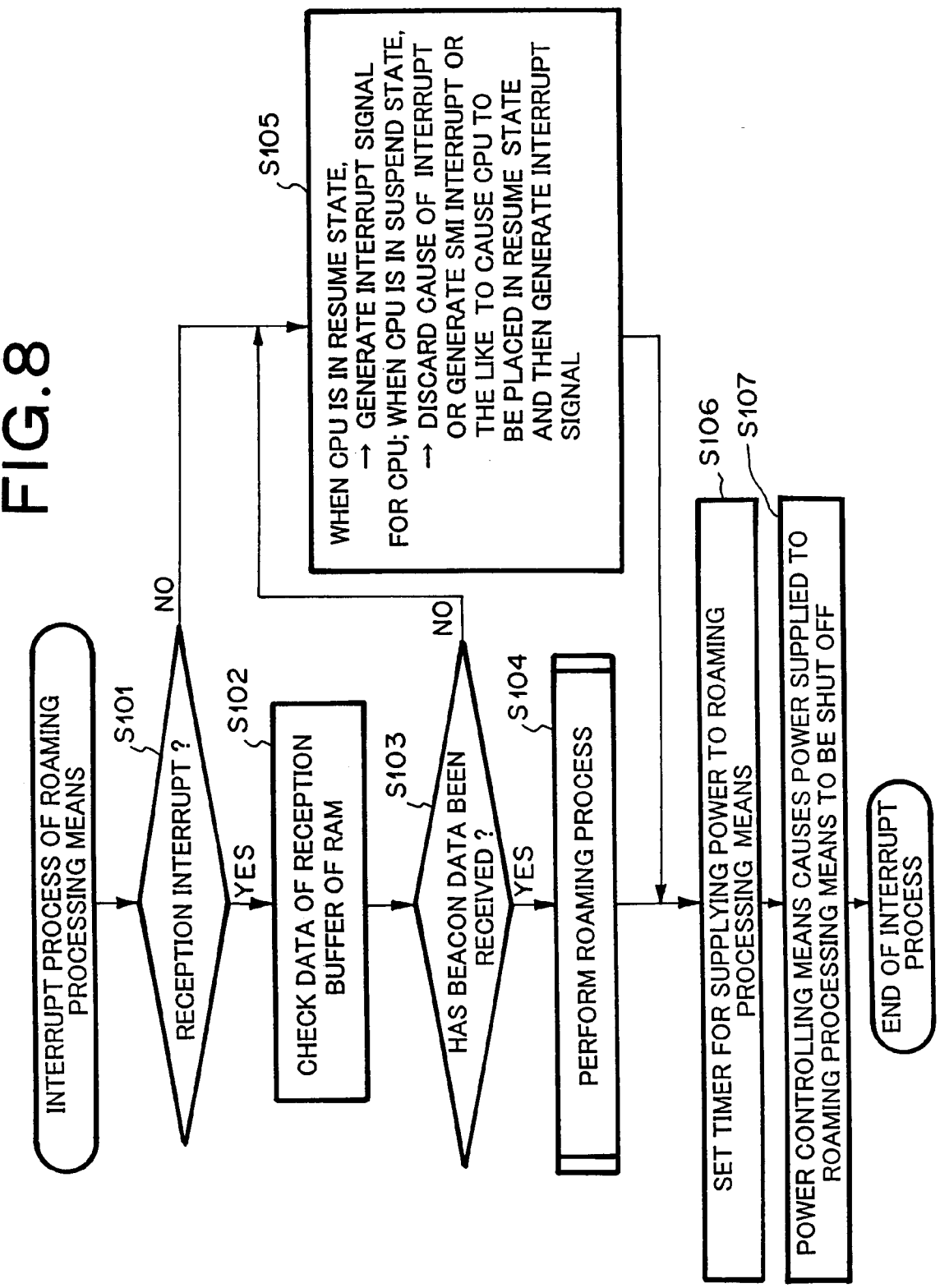

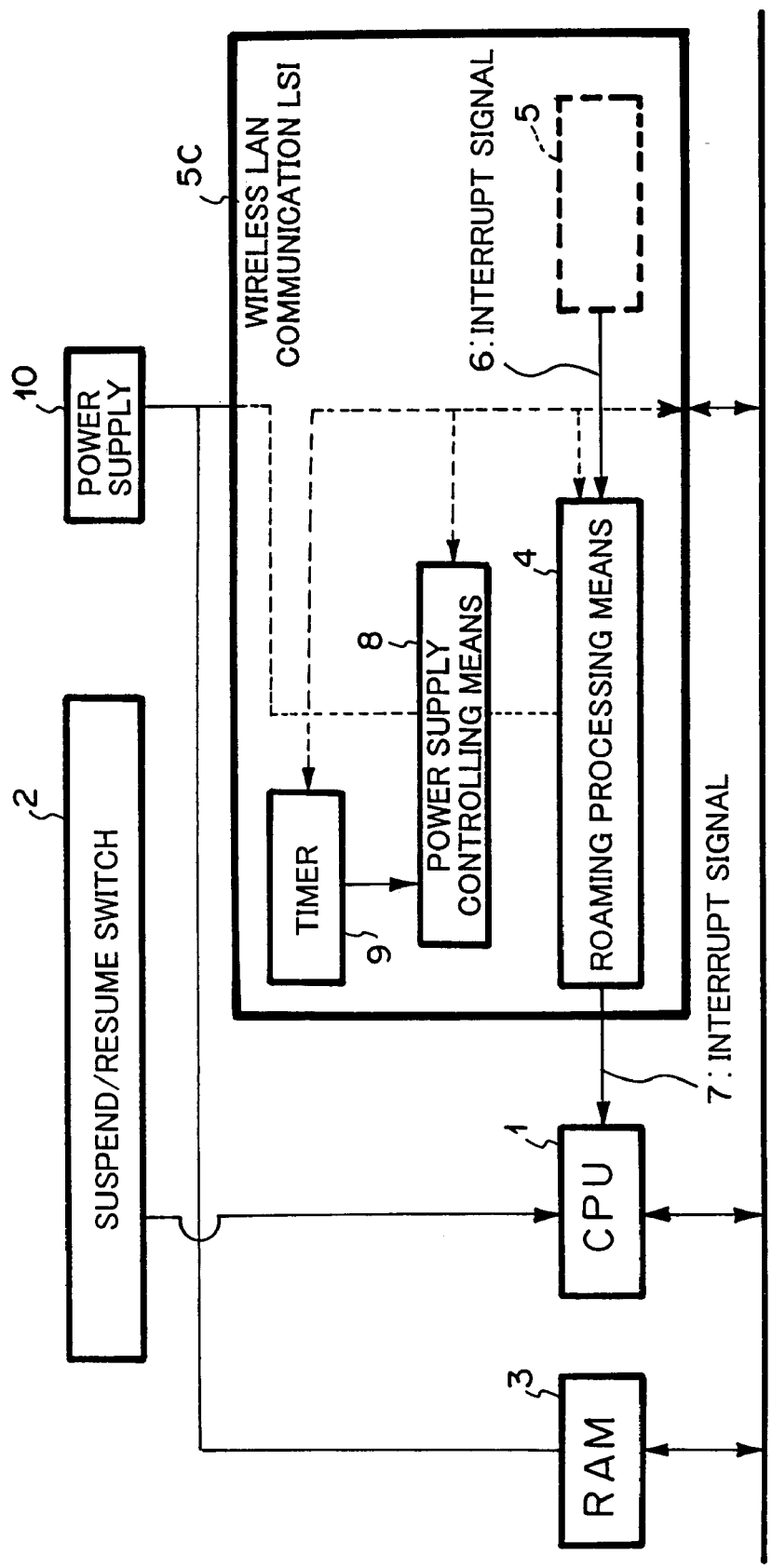

POWER MANAGEMENT SYSTEM FOR USE WITH WIRELESS LAN TERMINAL UNIT

BACKGROUND OF THE INVENTION

1. Field of the Invention

The present invention relates to a power management system for use with a portable information processing apparatus such as a portable information terminal unit that operates with a battery power and in particular, to a power management system for use with a wireless LAN terminal unit that performs a wireless LAN communication corresponding to IEEE 802.11 standard.

2. Description of the Prior Art

A portable LAN terminal unit should use a battery for the power supply. To suppress the power consumption, in the non-operating state, the power cannot be always supplied to the wireless LAN terminal unit. However, when the power of the terminal unit is fully turned off, it takes a long time to start up the wireless LAN terminal unit and its application program. To prevent such a problem, when the wireless LAN terminal unit is not used for a long time, it is normally placed in the suspend state. In the suspend state, the power supplied to the peripheral LSI is shut off (as prior art reference 1) or not shut off (as prior art reference 2) that depends on the characteristic of the peripheral LSI or the system operation. In the prior art reference 2, when data is received, the peripheral LSI (wireless LAN communication LSI) may generate an interrupt signal that causes the CPU to be resumed so as to receive the data.

However, when resuming the wireless LAN terminal unit after the power supplied to the wireless LAN communication LSI corresponding to the IEEE 802.11 standard have been shut off (as the prior art reference 1), in addition to the activation and re-initialization of the LSI, a wireless LAN bridge should be re-connected to the wireless LAN terminal unit. Thus, it takes a time for the wireless LAN terminal unit to return to the communicating state.

On the other hand, when the power supplied to the wireless LAN communication LSI is not shut off (as the prior art reference 2), the power consumption in the suspend state is larger than the power consumption in the power shutoff state. In addition, when the wireless LAN terminal unit is traveled when it is in the suspend state, a connecting process for another wireless LAN bridge is required. In that case, since the CPU cannot use the beacon data transmitted by the former wireless LAN bridge, the wireless LAN terminal unit cannot perform a connection switching process for the other wireless LAN bridge (referred to as "roaming process"). Thus, after the CPU is resumed, the wireless LAN terminal unit should perform the re-connecting process. Consequently, it takes a long time until the wireless LAN terminal unit can be used. FIG. 1 is a flow chart showing an example of the roaming process which will be explained later.

In a case where the CPU is resumed by an interrupt caused by the peripheral LSI (wireless LAN communication LSI) upon occurrence of the received data (as the prior art reference 2) so that the CPU performs a receiving process, the CPU is resumed so as to perform the roaming process whenever beacon data is periodically received. Thus, the power consumption becomes large.

SUMMARY OF THE INVENTION

The present invention has been made to overcome the aforementioned disadvantages and accordingly, has an object to provide a system that allows functions of a wireless LAN terminal unit including a communicating function to be quickly used without need to activate and re-initialize a wireless LAN communication LSI and to re-connect it with a wireless LAN bridge upon reception of beacon data from the wireless LAN bridge when the CPU is suspending.

According to a first aspect of the present invention, there is provided a power management system for use with a wireless LAN terminal unit, the system having: a CPU having a suspend/resume function, a RAM; a power supply; a switch for causing the CPU to be placed in the suspend state or a resume state; and a wireless LAN communication LSI; and roaming processing means for, when the wireless LAN terminal unit travels, performing a roaming process in which a wireless LAN bridge communication with the wireless LAN terminal unit is switched to another wireless LAN bridge, wherein when the CPU is placed in the suspend state, the wireless LAN communication LSI and the roaming processing means are operated by the power supplied by the power supply, and wherein when the CPU is placed is the suspend state, the roaming processing means performs the roaming process.

The power management system may further comprise: power supply controlling means for controlling the power supplied to the wireless LAN communication LSI and the roaming processing means, wherein the RAM has an area for storing information representing whether or not the power should be supplied to the wireless LAN communication LSI and the roaming processing means when the CPU is placed in the suspend state, and wherein the CPU determines whether or not to supply the power to the wireless LAN communication LSI and the roaming processing means through the power supply controlling means corresponding to the information when the CPU is placed in the suspend state.

In the power management system, the roaming processing means may be built in the wireless LAN communication LSI.

The power management system may further comprise: power supply controlling means for controlling the power supplied to the roaming processing means; and a timer, wherein the power supply controlling means uses the timer to supply the power to the roaming processing means in synchronism with the reception time of beacon data periodically transmitted from the wireless LAN bridge so that the roaming processing means performs the roaming process.

In the power management system, the roaming processing means, the power supply controlling means, and the timer may be built in the wireless LAN communication LSI.

In the power management system 1, the roaming process may be a process for executing a wireless LAN bridge connection switching protocol when the reception intensity of newly received beacon data from a new wireless LAN bridge is stronger than the reception intensity of older beacon data from a previous wireless LAN bridge, the reception intensity of older beacon data being stored in the RAM.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 8 is a flow chart showing a process of the power management system for use with the wireless LAN terminal unit according to the fifth embodiment of the present invention; and FIG. 9 is a block diagram showing the structure of a power management system for use with a wireless LAN terminal unit according to a sixth embodiment of the present invention.

DESCRIPTION OF PREFERRED EMBODIMENTS (First Embodiment)

Figure 2:
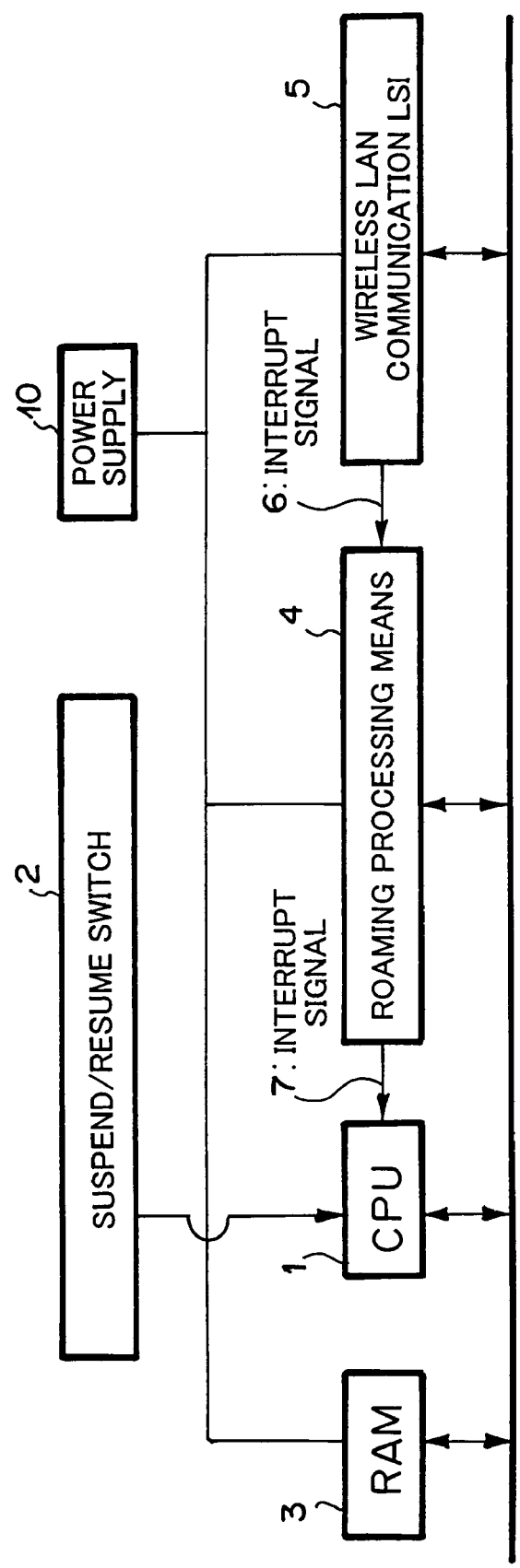
FIG. 2 is a block diagram showing the structure of the power management system for use with the wireless LAN terminal unit according to the first embodiment of the present invention.

FIG. 2 is a block diagram showing the structure of a power management system for use with a wireless LAN terminal unit according to a first embodiment of the present invention. In FIG. 2, a CPU 1, a RAM 3, a wireless LAN communication LSI 5, and a roaming processing means 4 are connected through a bus. A suspend/resume switch 2 is connected to the CPU 1. The suspend/resume switch 2 allows the user to select the suspend state or the resume state of the CPU 1. A power supply 10 supplies a power to the CPU 1, the RAM 3, the wireless LAN communication LSI 5, and the roaming processing means 4.

The wireless LAN communication LSI 5 supplies an interrupt signal 6 to the roaming processing means 4. The interrupt signal 6 represents that data has been transmitted, data has been received, or a command has been executed. The roaming processing means 4 supplies an interrupt signal 7 to the CPU 1. An interrupt for transmitting and receiving data other than the data necessary for the roaming process (namely, beacon data) can be successively transmitted from the interrupt signal 6 to the interrupt signal 7.

Figure 1:
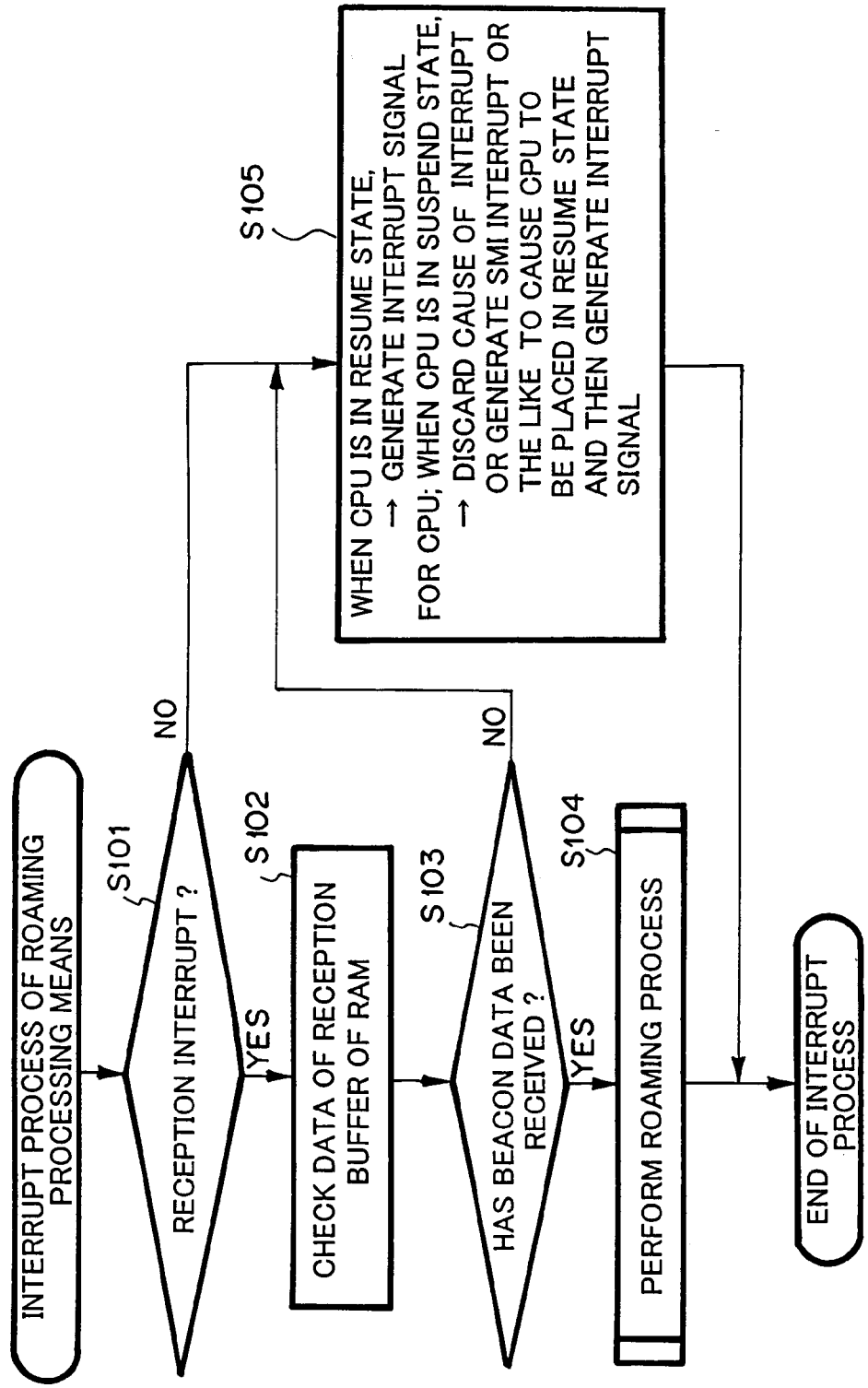
FIG. 1 is flow chart showing an example of the process of a power management system for use with a wireless LAN terminal unit according to a prior art reference and a first embodiment of the present invention.

FIG. 1 is a flow chart showing an example of an internal process of the roaming processing means 4 according to the first embodiment of the present invention.

Figure 3:
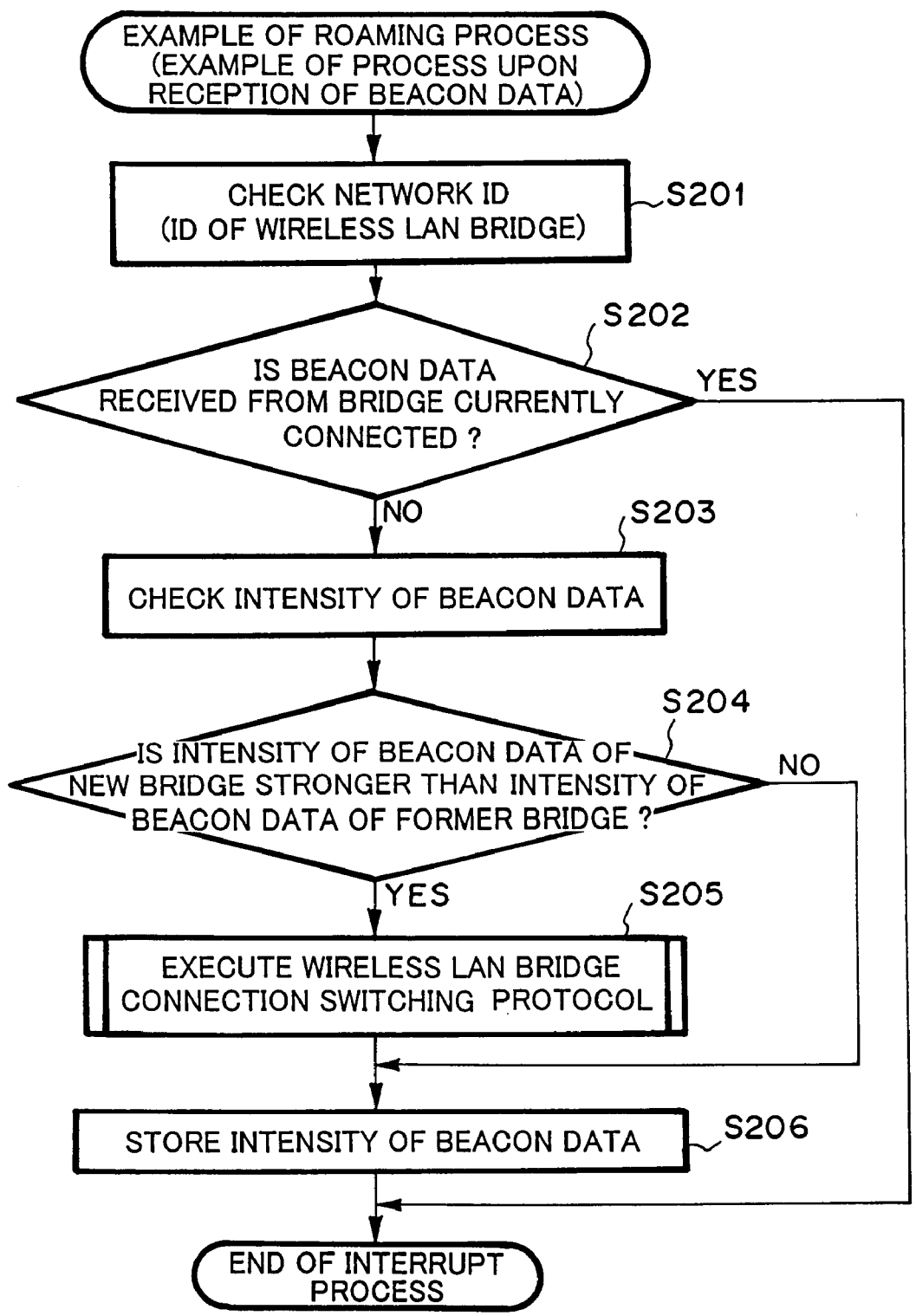
FIG. 3 is a flow chart showing an example of a roaming process of a roaming processing means according to the first embodiment of the present invention.

Next, the operation of the first embodiment of the present invention will be described. When the user does not use the wireless LAN terminal unit, he or she manipupates the suspend/resume switch 2 to switch the CPU 1 to the suspend state. In the suspend state, the power is supplied from the power supply 10 to the RAM 3, the wireless LAN communication LSI 5, and the roaming processing means 4. Thus, the wireless LAN communication LSI 5, and the roaming processing means 4 are operated. In the suspend state, when the wireless LAN communication LSI 5 receives data from the wireless LAN bridge, the wireless LAN communication LSI 5 stores the received data to a reception buffer in the RAM 3. In addition, the wireless LAN communication LSI 5 notifies the roaming processing means 4 that the data has been received using the interrupt signal 6. Corresponding to the flow chart shown in FIG. 1, the roaming processing means 4 determines whether or not the cause of the interrupt is a reception interrupt (at step S101). When the determined result at step S101 is Yes (namely, the cause of the interrupt is a reception interrupt), the wireless LAN communication LSI 5 checks the reception buffer of the RAM 3 (at step S102) and determines whether the reception date is beacon data (at step S103). When the determined result at step S103 is Yes (namely, the reception data is beacon data), the roaming processing means performs the roaming process (see FIG. 3). Referring to FIG. 3, the wireless LAN communication LSI 5 determines whether or not the reception data is received from the wireless LAN bridge that has been connected on the basis of the network ID contained in the beacon data (at steps S201 and S202). When the determined result at step S202 is No (namely, the reception data is received from a new wireless LAN bridge), the wireless LAN communication LSI 5 checks the intensity of the beacon data (at step S203). When the determined result at step S204 is Yes (namely, the intensity of the beacon data of the new wireless LAN bridge is stronger than the intensity of the beacon data that was received from the former wireless LAN bridge), the wireless LAN communication LSI 5 executes a connection switching protocol so as to switch the connection with the former wireless LAN bridge to the connection with the new wireless LAN bridge (at step S205). In addition, the wireless LAN communication LSI 5 stores the intensity of the beacon data so as to compare it with beacon data that will be received (at step S206).

When the determined result at step S101 is No (namely, the cause of the interrupt is not reception data of beacon data), if the CPU is in the resume state, the wireless LAN communication LSI 5 generates an interrupt signal for the CPU 1. Thus, the CPU performs a required interrupt process. On the other hand, when the CPU is in the suspend state, the wireless LAN communication LSI 5 discards the cause of the interrupt. Alternatively, the wireless LAN communication LSI 5 causes the CPU 1 to be placed in the resume state, issues an interrupt signal for the CPU 1, and then causes the CPU to perform a required interrupt process. One of these methods is selected dependently on the operating method of the system.

In the operating state in which a push type communication service is performed with high priority (namely, data is asynchronously transmitted), it is optimum to receive data by resuming the CPU 1. In the operating state in which a pull type communication service is performed with high priority (namely, communication is performed only when a user requires), it is optimum to discard the cause of the interrupt.

(Second Embodiment)

Figure 4:
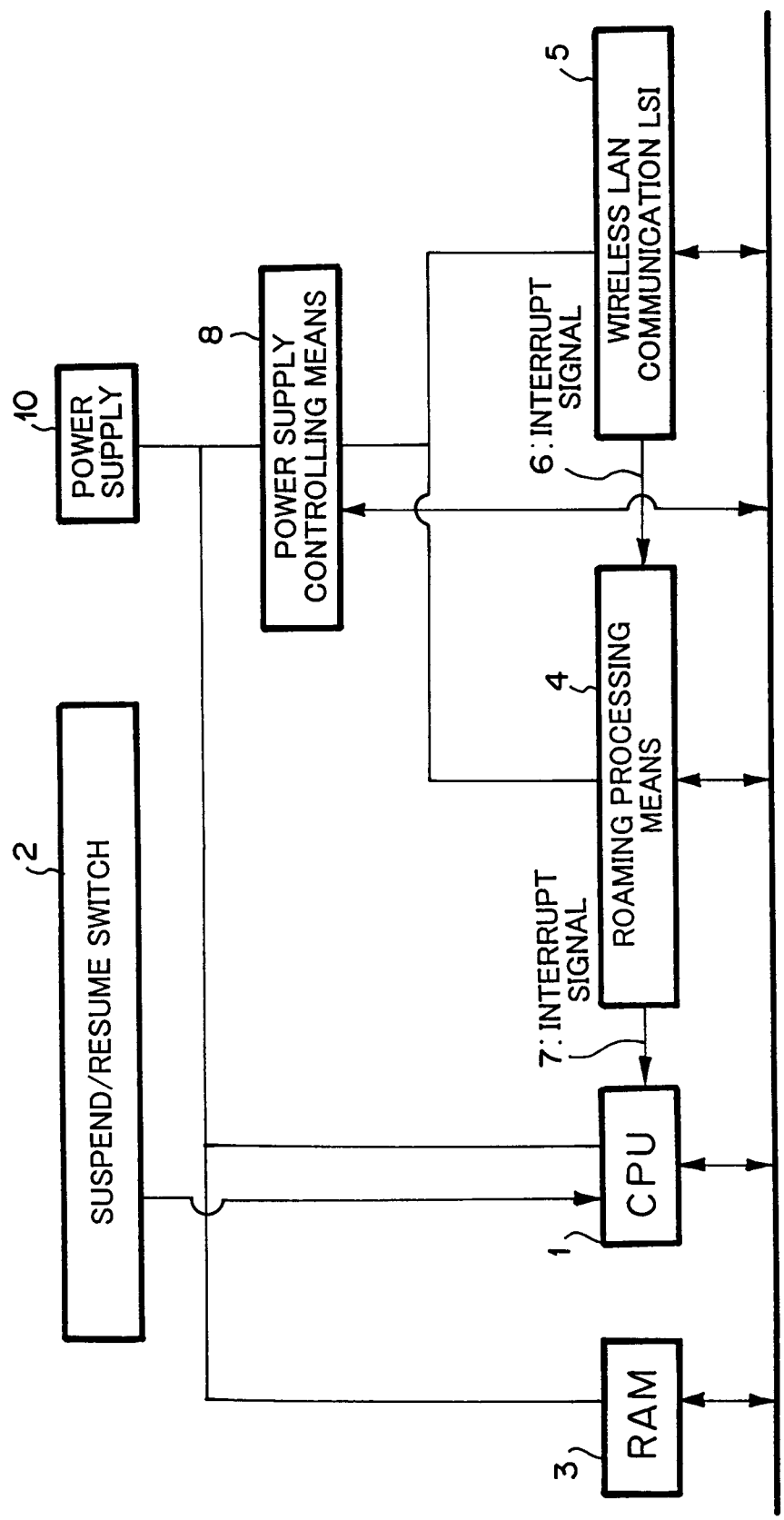
FIG. 4 is a block diagram showing the structure of a power management system for use with a wireless LAN terminal unit according to a second embodiment of the present invention.

FIG. 4 is a block diagram showing the structure of a power management system for use with a wireless LAN terminal unit according to a second embodiment of the present invention. In FIG. 4, a CPU 1, a RAM 3, a wireless LAN communication LSI 5, and a roaming processing means 4 are connected through a bus. A suspend/resume switch 2 is connected to the CPU 1. The suspend/resume switch 2 allows the user to select the suspend state or the resume state of the CPU 1. A power supply 10 supplies a power to the CPU 1 and the RAM 3.

A power supply controlling means 8 is disposed between the wireless LAN communication LSI 5 and the roaming processing means 4, and the power supply 10. The power supply controlling means 8 is connected to the bus. Thus, the CPU 1 can control the power supplied to the wireless LAN communication LSI 5 and the roaming processing means 4.

The RAM 3 has an area for storing information representing whether the power supplied to the wireless LAN communication LSI 5 and the roaming processing means 4 should be shut off or kept in the suspend state.

The wireless LAN communication LSI 5 supplies an interrupt signal 6 to the roaming processing means 4. The interrupt signal 6 represents that data has been transmitted, data has been received, or a command has been executed. The roaming processing means 4 supplies an interrupt signal 7 to the CPU 1. An interrupt for transmitting and receiving data other than the data necessary for the roaming process (namely, beacon data) can be successively transmitted from the interrupt signal 6 to the interrupt signal 7.

Next, the operation of the second embodiment will be described. When the user does not use the wireless LAN terminal unit, with the suspend/resume switch 2, he or she places the CPU 1 in the suspend state. Before the CPU 1 is placed in the suspend state, the power supply controlling means 8 controls the power supplied to the wireless LAN communication LSI 5 and the roaming processing means 4 corresponding to the information stored in the RAM 3. In other words, when the data stored in the RAM 3 represents the shutoff of the power, the data causes the power supply controlling means 8 to shut off the power. On the other hand, when the data represents the maintenance of the power, the data causes the power supply controlling means 8 not to shut off the power.

The operation in the case that a command that represents the maintenance of the power is stored in the RAM 3 is the same as that of the first embodiment. For simplicity, the description is omitted.

The operation in the case that a command that represents the shutoff of the power is stored in the RAM 3 is the same as that of the prior art reference 1. For simplicity, the description is omitted.

(Third Embodiment)

Figure 5:
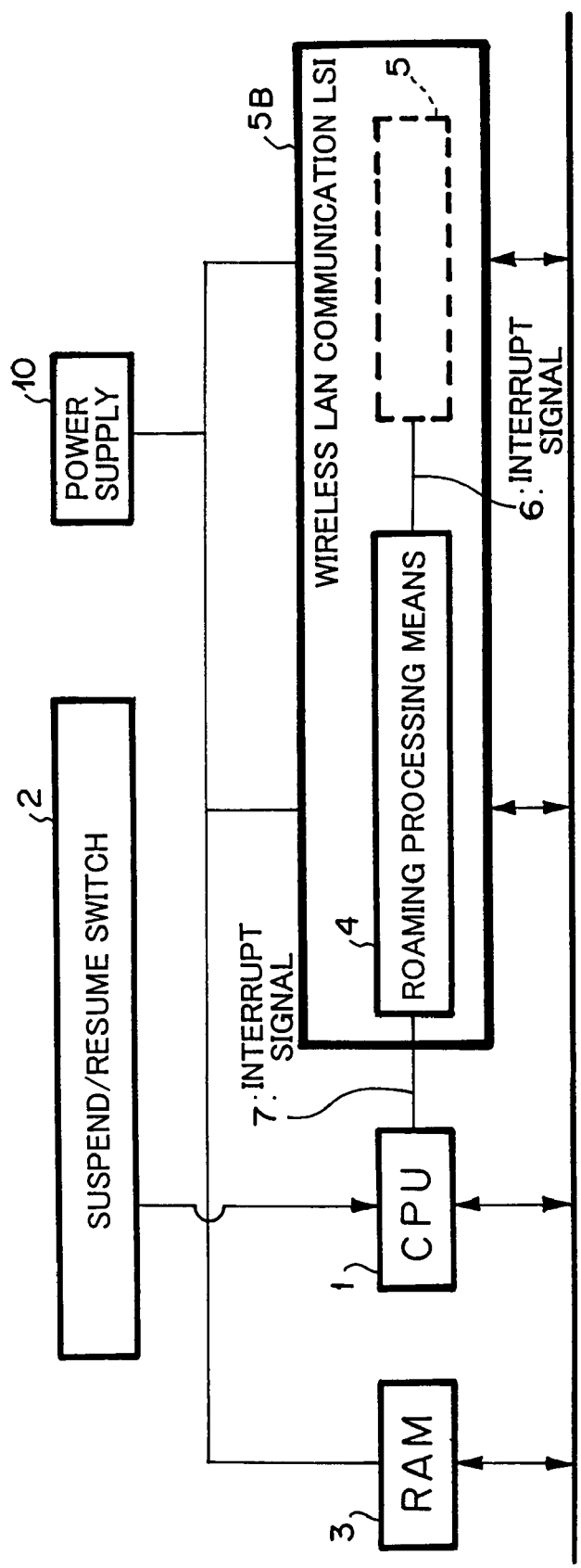
FIG. 5 is a block diagram showing the structure of a power management system for use with a wireless LAN terminal unit according to a third embodiment of the present invention.

FIG. 5 is a block diagram showing the structure of a power management system for use with a wireless LAN terminal unit according to a third embodiment of the present invention. In FIG. 5, a CPU 1, a RAM 3, and a wireless LAN communication LSI 5B are connected through a bus. In addition, a roaming processing means 4 is built in the wireless LAN communication LSI 5B. A suspend/resume switch 2 is connected to the CPU 1. The suspend/resume switch 2 allows the user to place the CPU 1 in the suspend state or the resume state. A power supply 10 supplies a power to the CPU 1, the RAM 3, and the wireless LAN communication LSI 5B.

The roaming processing means 4 built in the wireless LAN communication LSI 5B supplies an interrupt signal 7 to the CPU 1. An interrupt for transmitting and receiving data other than the data necessary for the roaming process (namely, beacon data) can be successively transmitted from the interrupt signal 6 to the interrupt signal 7. Since the operation of the third embodiment is the same as the operation of the first embodiment, the description thereof is omitted.

(Fourth Embodiment)

Figure 6:
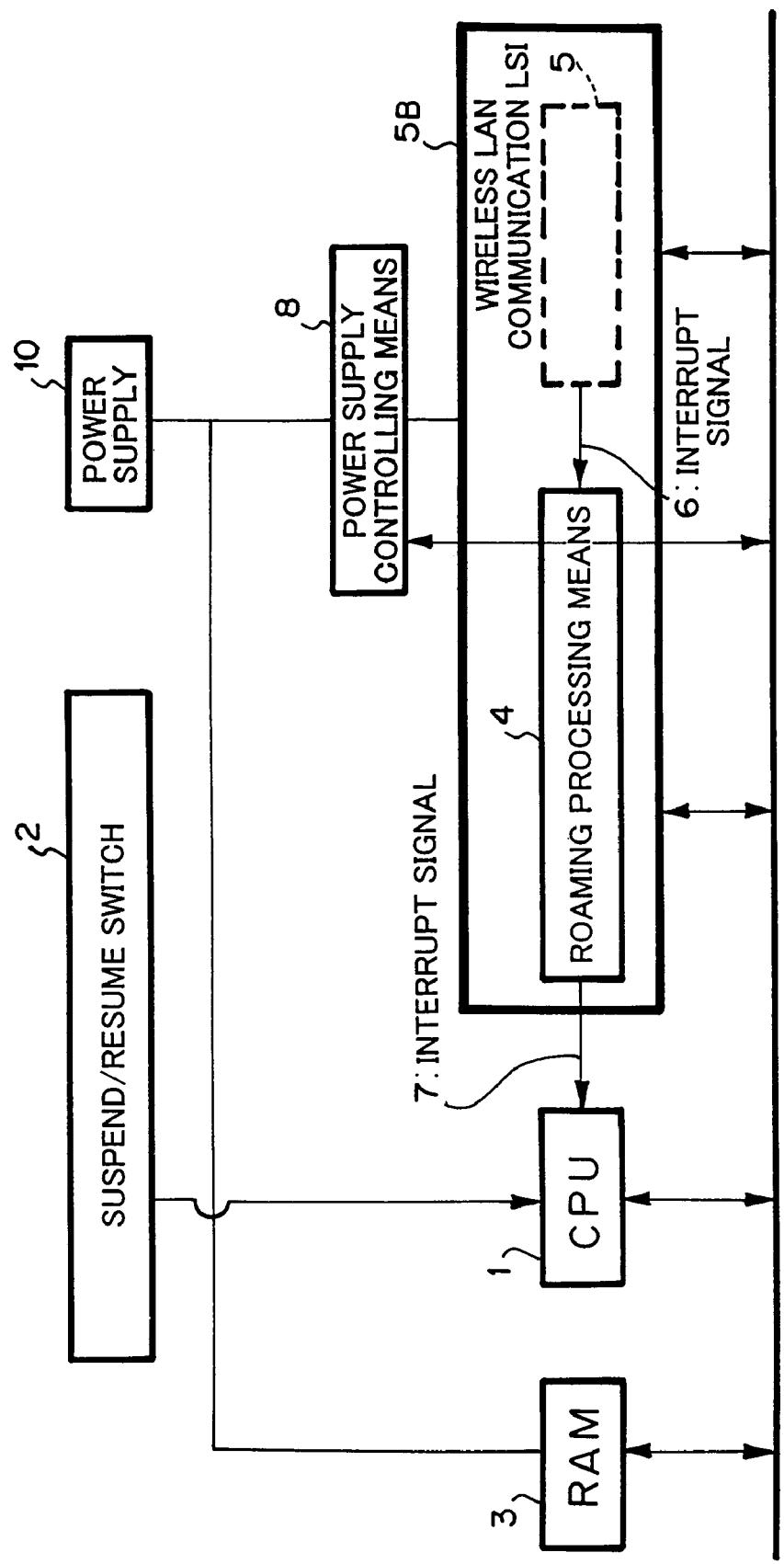
FIG. 6 is a block diagram showing the structure of a power management system for use with a wireless LAN terminal unit according to a fourth embodiment of the present invention.

FIG. 6 is a block diagram showing the structure of a power management system for use with a wireless LAN terminal unit according to a fourth embodiment of the present invention. In FIG. 6, a CPU 1, a RAM 3, and a wireless LAN communication LSI 5B are connected through a bus. In addition, a roaming processing means 4 is built in the wireless LAN communication LSI 5B. A suspend/resume switch 2 is connected to the CPU 1. The suspend/resume switch 2 allows the user to place the CPU 1 in the suspend state or the resume state. A power supply 10 supplies a power to the CPU 1 and the RAM 3.

A power supply controlling means 8 is disposed between the wireless LAN communication LSI 5B and the power supply 10. The power supply controlling means 8 is connected to the bus. Thus, the CPU 1 can control the power supplied to the wireless LAN communication LSI 5B.

The RAM 3 has an area for storing information representing whether the power supplied to the wireless LAN communication LSI 5B should be shut off or kept in the suspend state. Before the CPU 1 is placed in the suspend state, the power supply controlling means 8 controls the power supplied to the wireless LAN communication LSI 5B corresponding to the information stored in the RAM 3. In other words, when the data stored in the RAM 3 represents the shutoff of the power, the data causes the power supply controlling means 8 to shut off the power. On the other hand, when the data represents the maintenance of the power, the data causes the power supply controlling means 8 not to shut off the power.

An interrupt signal 6 is supplied from a portion equivalent to a wireless LAN communication LSI 5 to the roaming processing means 4. The interrupt signal 6 represents that data has been transmitted, data has been received, and a command has been executed. The roaming processing means 4 supplies an interrupt signal 7 to the CPU 1. An interrupt for transmitting and receiving data other than the data necessary for the roaming process (namely, beacon data) can be successively transmitted from the interrupt signal 6 to the interrupt signal 7. Since the operation of the fourth embodiment is the same as the operation of the first embodiment, the description thereof is omitted.

(Fifth Embodiment)

Figure 7:
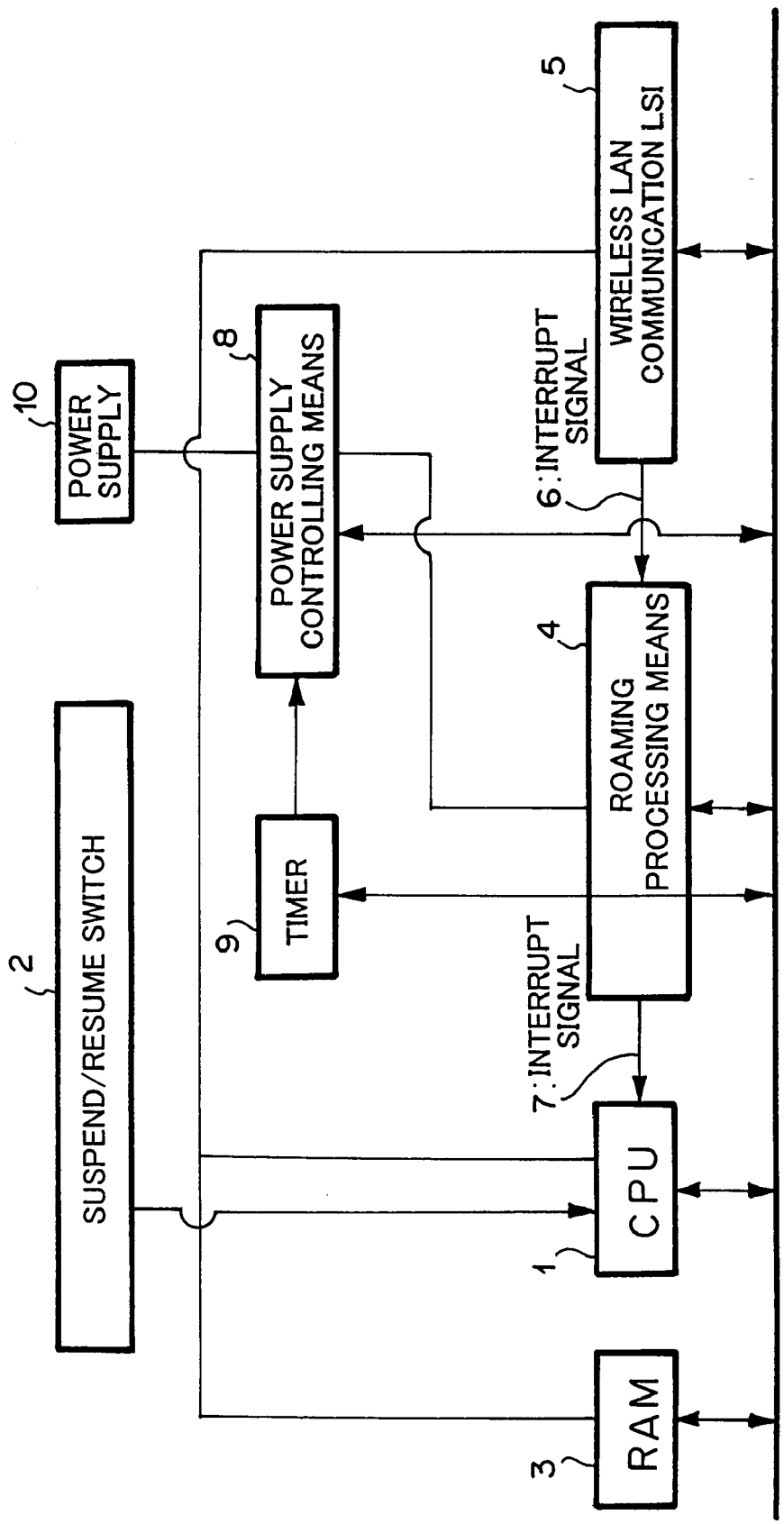
FIG. 7 is a block diagram showing the structure of a power management system for use with a wireless LAN terminal unit according to a fifth embodiment of the present invention.

FIG. 7 is a block diagram showing the structure of a power management system for use with a wireless LAN terminal unit according to a fifth embodiment of the present invention. In FIG. 7, a CPU 1, a RAM 3, a wireless LAN communication LSI 5, and a roaming processing means 4 are connected through a bus. A suspend/resume switch 2 is connected to the CPU 1. The suspend/resume switch 2 allows the user to place the CPU 1 in the suspend state or the resume state. A power supply 10 supplies a power to the CPU 1, the RAM 3, and the wireless LAN communication LSI 5.

A power supply controlling means 8 is disposed between the roaming processing means 4 and the power supply 10. A timer 9 is connected to the bus. A signal that is output from the timer 9 is supplied to the power supply controlling means 8. Thus, with the timer 9, the roaming processing means 4 can determine whether or not the power should be supplied to the roaming processing means 4 itself.

The wireless LAN communication LSI 5 supplies an interrupt signal 6 to the roaming processing means 4. The interrupt signal 6 represents that data has been transmitted, data has been received, or a command has been executed. The roaming processing means 4 supplies an interrupt signal 7 to the CPU 1. An interrupt for transmitting and receiving data other than the data necessary for the roaming process (namely, beacon data) can be successively transmitted from the interrupt signal 6 to the interrupt signal 7.

Next, the operation of the fifth embodiment will be described. When the user does not use the wireless LAN terminal unit, with the suspend/resume switch 2, he or she places the CPU 1 in the suspend state. In this state, the power is supplied from the power supply 10 to the RAM 3 and the wireless LAN communication LSI 5. Thus, the RAM 3 and the wireless LAN communication LSI 5 can be operated. The power supplied to the roaming processing means 4 is controlled by the power supply controlling means 8 using signal supplied form the timer 9. The power is controlled in the following manner.

In other words, when the wireless LAN terminal unit is started up, the power is supplied to the roaming processing means 4. In that state, even in the suspend state, as with the first embodiment, the roaming process is performed corresponding to the flow chart shown in FIG. 2. In the operation of the structure according to the fifth embodiment, after the roaming process (at steps S101 to S105 shown in FIG. 8) corresponding to the flow chart shown in FIG. 1 is completed, the roaming processing means 4 sets time at which it is assumed that beacon data will be received as the start timer value to the timer 9 (at step S106 shown in FIG. 8). The power supply controlling means 8 shuts off the power to the roaming processing means 4 (at step S107 shown in FIG. 8). When the setup time elapses, the timer 9 times out. Thus, a signal that is output from the timer 9 is supplied to the power supply controlling means 8. As a result, the power supplied to the roaming processing means 4 is resumed. Consequently, the roaming processing means 4 performs the roaming process.

(Sixth Embodiment)

FIG. 9 is a block diagram showing the structure of a power management system for use with a wireless LAN terminal unit according to a sixth embodiment of the present invention. In FIG. 9, a CPU 1, a RAM 3, and a wireless LAN communication LSI 5C are connected through a bus. A suspend/resume switch 2 is connected to the CPU 1. The suspend/resume switch 2 allows the user to place the CPU 1 in the suspend state or the resume state. A power supply 10 supplies a power to the CPU 1, the RAM 3, and the wireless LAN communication LSI 5C.

A roaming processing means 4, a power supply controlling means 8, and a timer 9 are built in the wireless LAN communication LSI 5C. A signal that is output from the timer 9 is supplied to the power supply controlling means 8. With the signal that is output from the timer 9, the roaming processing means 4 can determine whether or not the power should be supplied to the roaming processing means 4.

An interrupt signal 7 is supplied from the roaming processing means 4 to the CPU 1. Information that represents data other than the data necessary for the roaming process (beacon data and so forth) (namely, the completion of a data transmission, an occurrence of a data reception, the end of a command, and so forth) can be successively transmitted from the interrupt signal 6 to the interrupt signal 7.

Since the operation of the sixth embodiment is the same as the operation of the fifth embodiment, the description thereof is omitted.

As described above, according to the first aspect of the present invention, since the roaming process can be executed even if the CPU is in the suspend state, the wireless LAN terminal unit that consumes lesser power than a conventional wireless LAN terminal that resumes a CPU to execute the roaming process is provided.

In the conventional case that the CPU is not resumed from the suspend state to suppress the power consumption, and the conventional case that the power supplied to the wireless LAN communication LSI is shut off to suppress the power consumption, the starting process and the reinitializing process of the wireless LAN communication LSI and the reconnecting process for a wireless LAN bridge are required. However, according to the present invention, such processes are not required. Thus, the function of the wireless LAN terminal unit including the communication function can be quickly used.

According to the second aspect of the present invention, it is possible to select one of shortening the time for resuming the terminal and minimizing the power consumption of the terminal.

According to the fourth aspect of the present invention, the power consumption can be more suppressed than the first aspect of the present invention.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A power management system for use with a wireless LAN terminal unit, the system having:
    a CPU having a suspend/resume function,
    a RAM;
    a power supply;
    a switch for causing said CPU to be placed in the suspend state or a resume state; and
    a wireless LAN communication LSI; and
    roaming processing means for, when the wireless LAN terminal unit travels, performing a roaming process in which a wireless LAN bridge communication with the wireless LAN terminal unit is switched to another wireless LAN bridge,
    wherein when said CPU is placed in the suspend state, the wireless LAN communication LSI and the roaming processing means are operated by the power supplied by the power supply, and
    wherein when the CPU is placed in the suspend state, the roaming processing means performs the roaming process.

2. The power management system as set forth in claim 1, further comprising:
    power supply controlling means for controlling the power supplied to said wireless LAN communication LSI and said roaming processing means,
    wherein said RAM has an area for storing information representing whether or not the power should be supplied to said wireless LAN communication LSI and said roaming processing means when said CPU is placed in the suspend state, and
    wherein said CPU determines whether or not to supply the power to said wireless LAN communication LSI and said roaming processing means through said power supply controlling means corresponding to said information when said CPU is placed in the suspend state.

3. The power management system as set forth in claim 1, wherein said roaming processing means is built in said wireless LAN communication LSI.

4. The power management system as set forth in claim 1,
- wherein the roaming process is a process for executing a wireless LAN bridge connection switching protocol when the reception intensity of newly received beacon data from a new wireless LAN bridge is stronger than the reception intensity of older beacon data from a previous wireless LAN bridge, said reception intensity of older beacon data being stored in said RAM.

5. The power management system as set forth in claim 1, further comprising:
- power supply controlling means for controlling the power supplied to the roaming processing means; and
- a timer,
- wherein the power supply controlling means uses said timer to supply the power to said roaming processing means in synchronism with the reception time of beacon data periodically transmitted from the wireless LAN bridge so that the roaming processing means performs the roaming process.

6. The power management system as set forth in claim 5,
- wherein said roaming processing means, said power supply controlling means, and said timer are built in said wireless LAN communication LSI.

\* \* \* \* \*